United States Patent
Everson et al.

(10) Patent No.: US 7,466,991 B2
(45) Date of Patent: Dec. 16, 2008

(54) METHOD AND SYSTEM USING A CONFERENCE BRIDGE FOR HANDOFF OF A MULTI-MODE MOBILE STATION

(75) Inventors: John M. Everson, Kansas City, MO (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 618 days.

(21) Appl. No.: 11/138,180

(22) Filed: May 26, 2005

(65) Prior Publication Data

US 2006/0270447 A1 Nov. 30, 2006

(51) Int. Cl.
*H04M 1/00* (2006.01)
(52) U.S. Cl. .................. 455/552.1; 455/436; 455/432.3
(58) Field of Classification Search ............... 455/552.1
See application file for complete search history.

(56) References Cited

U.S. PATENT DOCUMENTS

| | | | | |
|---|---|---|---|---|
| 6,161,013 | A * | 12/2000 | Anderson et al. ............ 455/437 |
| 6,243,581 | B1 * | 6/2001 | Jawanda .................. 455/432.2 |
| 6,532,365 | B1 * | 3/2003 | Anderson et al. ............ 455/437 |
| 6,680,923 | B1 | 1/2004 | Leon |
| 6,681,115 | B1 * | 1/2004 | McKenna et al. ........... 455/517 |
| 6,721,565 | B1 | 4/2004 | Ejzak et al. |
| 6,889,045 | B2 * | 5/2005 | Pan et al. .................... 455/436 |
| 7,009,952 | B1 * | 3/2006 | Razavilar et al. ............ 370/331 |
| 7,032,009 | B2 * | 4/2006 | Dowling ..................... 709/217 |
| 7,133,386 | B2 * | 11/2006 | Holur et al. ................. 370/331 |
| 7,155,238 | B2 * | 12/2006 | Katz ........................ 455/456.1 |
| 7,188,185 | B2 * | 3/2007 | Dowling ..................... 709/230 |
| 7,228,355 | B2 * | 6/2007 | Dowling ..................... 709/230 |
| 7,245,913 | B1 * | 7/2007 | Nguyen et al. ............ 455/435.2 |
| 7,245,917 | B2 * | 7/2007 | Chiueh ....................... 455/442 |
| 7,254,119 | B2 * | 8/2007 | Jiang et al. .................. 370/328 |
| 7,293,110 | B2 * | 11/2007 | Dowling ..................... 709/249 |
| 7,398,088 | B2 * | 7/2008 | Belkin et al. ................ 455/439 |
| 7,400,885 | B2 * | 7/2008 | Bakri ......................... 455/436 |
| 2002/0028690 | A1 * | 3/2002 | McKenna et al. ........... 455/517 |

(Continued)

OTHER PUBLICATIONS

International Search Report and Written Opinion from International Application No. PCT/US06/017737, dated Sep. 28, 2006.

(Continued)

*Primary Examiner*—Matthew D. Anderson
*Assistant Examiner*—Hai V Nguyen

(57) ABSTRACT

A multi-mode mobile station includes a first interface for wireless communication with a wireless local area network (WLAN) and a second interface for wireless communication with a wireless wide area network (WWAN). The multi-mode mobile station is associated with a particular conference bridge, through which all calls to and from the multi-mode mobile station are routed. For example, when a call involving the multi-mode mobile is established via the WLAN, the call includes a WLAN call leg that extends from the conference bridge to the multi-mode mobile station via the WLAN. To effect a handoff during the call, a WWAN call leg is established between the multi-mode mobile station and the conference bridge via the WWAN. The conference bridge bridges the WLAN and WWAN call legs. To complete the handoff, the multi-mode mobile station drops the WLAN call leg and continues the call using the WWAN call leg.

20 Claims, 6 Drawing Sheets

U.S. PATENT DOCUMENTS

| | | |
|---|---|---|
| 2002/0085516 A1 | 7/2002 | Bridgelall |
| 2002/0147008 A1 | 10/2002 | Kallio |
| 2003/0027569 A1 | 2/2003 | Ejzak |
| 2003/0125028 A1 | 7/2003 | Reynolds |
| 2003/0133421 A1 | 7/2003 | Sundar et al. |
| 2003/0134636 A1 | 7/2003 | Sundar et al. |
| 2003/0134638 A1 | 7/2003 | Sundar et al. |
| 2003/0134650 A1 | 7/2003 | Sundar et al. |
| 2004/0146021 A1 | 7/2004 | Fors et al. |
| 2004/0184422 A1* | 9/2004 | Shaheen .................. 370/331 |
| 2004/0192294 A1 | 9/2004 | Pan et al. |
| 2004/0203788 A1 | 10/2004 | Fors et al. |
| 2004/0203791 A1 | 10/2004 | Pan et al. |
| 2004/0218575 A1* | 11/2004 | Ibe et al. .................. 370/338 |
| 2004/0246990 A1 | 12/2004 | Krishnamurthi et al. |
| 2004/0264410 A1 | 12/2004 | Sagi et al. |
| 2004/0266426 A1* | 12/2004 | Marsh et al. ............. 455/426.2 |
| 2005/0047372 A1* | 3/2005 | Yano et al. ................. 370/331 |
| 2005/0047435 A1 | 3/2005 | Segal et al. |
| 2005/0053034 A1* | 3/2005 | Chiueh ..................... 370/331 |
| 2005/0070288 A1 | 3/2005 | Belkin et al. |
| 2005/0203673 A1* | 9/2005 | El-Hajj et al. .................. 701/1 |
| 2005/0286466 A1* | 12/2005 | Tagg et al. .................. 370/329 |
| 2006/0068777 A1* | 3/2006 | Sadowsky et al. ........... 455/427 |
| 2006/0068799 A1* | 3/2006 | Morton et al. .............. 455/450 |
| 2006/0140150 A1* | 6/2006 | Olvera-Hernandez et al. .......... 370/331 |
| 2006/0291419 A1* | 12/2006 | McConnell et al. ......... 370/331 |
| 2006/0291455 A1* | 12/2006 | Katz et al. .................. 370/355 |
| 2007/0087748 A1 | 4/2007 | Du et al. |
| 2007/0171869 A1* | 7/2007 | Salkintzis ................... 370/331 |

OTHER PUBLICATIONS

J. Rosenberg and H. Schulzrinne, "Models for Multi Party Conferencing in SIP," Internet Draft, Jul. 1, 2002.
Brooktrout, Inc., "SnowShore IP Media Server," 2004.
AudioCodes, Ltd., "IPmedia 2000 Media Server Platform," 2004.
Lucent Technologies, "IP Multimedia Subsystem (IMS) Service Architecture," 2004.
International Preliminary Report on Patentability, dated Dec. 13, 2007, from related International Application No. PCT/US2006/017737.

* cited by examiner

METHOD AND SYSTEM USING A CONFERENCE BRIDGE FOR HANDOFF OF A MULTI-MODE MOBILE STATION

BACKGROUND

1. Field of the Invention

The present invention relates to telecommunications and, more particularly, to a method and system that uses a conference bridge for handoff of a multi-mode mobile station from a first wireless network to a second wireless network.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, or HomeRF, have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. Although such multi-mode mobile stations can provide better wireless coverage in more areas by being able to communicate over different wireless networks, they do not necessarily change their network connectivity in a seamless manner. For example, while engaged in a call via a first wireless network, the multi-mode mobile station may move into an area in which the first wireless network no longer provides good wireless coverage but the second wireless network does. In that situation, it would be desirable for the multi-mode mobile station to be able to continue the call via the second wireless network.

Accordingly, there is a need for methods and systems that can facilitate handoffs of multi-mode mobile stations, for example, from a WWAN to a WLAN or vice versa.

SUMMARY

In a first principal aspect, an exemplary embodiment of the present invention provides a method for effecting a handoff of a multi-mode mobile station from a first wireless network to a second wireless network. The multi-mode mobile station has a first interface for wireless communication with the first wireless network and a second interface for wireless communication with the second wireless network. In accordance with the method, a call request is received that requests establishment of a call between the multi-mode mobile station and an endpoint. In response to the call request, a first call leg is established between a conference bridge and the multi-mode mobile station via the first wireless network. A handoff request is received. In response to the handoff request, a second call leg is established between the conference bridge and the multi-mode mobile station via the second wireless network. The conference bridge bridges the first and second call legs. The first call leg is dropped.

In a second principal aspect, an exemplary embodiment of the present invention provides a method for communicating with multi-mode mobile stations that can communicate with at least a first wireless network and a second wireless network. In accordance with the method, each one of a plurality of the multi-mode mobile station is associated with a particular one of a plurality of conference bridges. A call request is received that requests establishment of a call between an endpoint and a given one of the multi-mode mobile stations. In response to the call request, a given conference bridge that is associated with the given multi-mode mobile station is identified from among the plurality of conference bridges. The call is established through the given conference bridge.

In a third principal aspect, an exemplary embodiment of the present invention provides a system for providing wireless telecommunications for a plurality of multi-mode mobile stations. The system comprises a first wireless network, a second wireless network, a plurality of conference bridges communicatively coupled to the first and second wireless networks, a database, and a call control system that is communicatively coupled to the database and to the plurality of conference bridges. The database associates each one of the plurality of multi-mode mobile stations with a particular one of the plurality of conference bridges. The call control system selectively routes calls to and from the multi-mode mobile stations through their associated conference bridges.

DETAILED DESCRIPTION OF EXEMPLARY EMBODIMENTS

1. Overview

Figure 1:
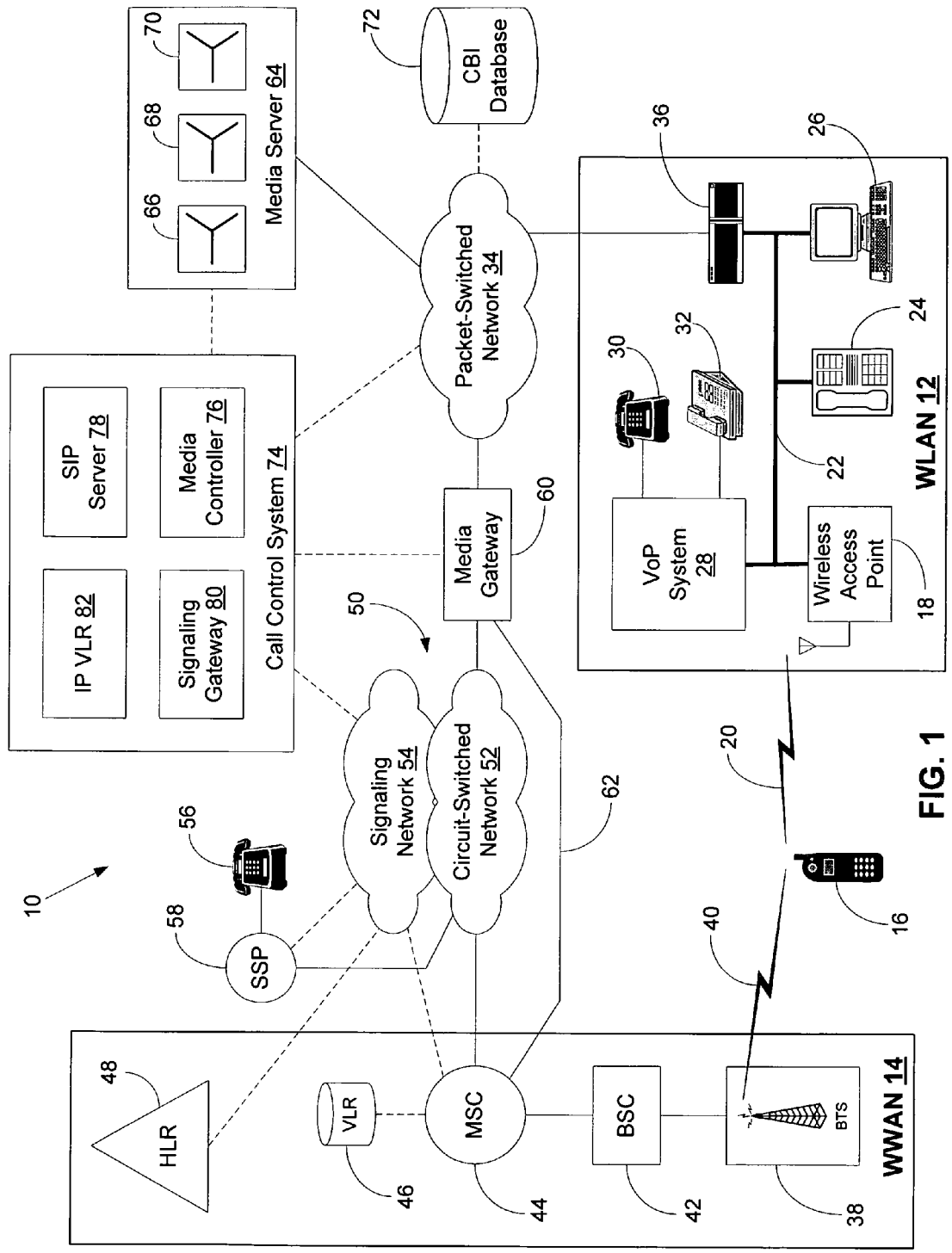
FIG. 1 is a simplified block diagram of a wireless telecommunications system, in accordance with an exemplary embodiment of the present invention.

The present invention, in its preferred embodiments, uses conference bridges to facilitate handoffs of multi-mode mobile stations between a first wireless network and a second wireless network. The first and second wireless networks use different wireless communication technologies. For example, the first wireless network could be a wireless local area network (WLAN) that uses a protocol such as IEEE 802.11x, HiperLAN, HomeRF, Bluetooth for wireless communication. The second wireless network could be a wireless wide area network (WWAN) that uses, for example, CDMA or GSM for wireless communication. Thus, a multi-mode mobile station may have at least a first interface for wireless communication with the first wireless network and a second interface for wireless communication with the second wireless network.

In an exemplary embodiment, a plurality of conference bridges are communicatively coupled to the first wireless network and to the second wireless network, and each multi-mode mobile station is associated with a particular conference bridge from among the plurality of conference bridges. The plurality of conference bridges may be provided by one or more network elements, such as media servers or media resource functions (MRFs). The conference bridges may convey media in a packet format. For example, the conference bridges could be provided by a media server that is coupled to the first wireless network via a packet-switched network and to the second wireless network via the packet-switched network, a media gateway, and a circuit-switched network. The media gateway may convert between the media formats used in the packet-switched and circuit-switched networks.

The multi-mode mobile stations may be associated with particular conference bridges through the use of conference bridge identifiers. For example, each conference bridge may be given a conference bridge identifier, so as to define a plurality of conference bridge identifiers, and each multi-mode mobile station may be assigned (either statically or dynamically) one of these conference bridge identifiers. A database may store information regarding which multi-mode mobile stations are associated with which conference bridges. For example, the database may store a mobile station identifier for each multi-mode mobile station, e.g., a mobile directory number (MDN), mobile station identification (MSID), and/or electronic serial number (ESN), such that the mobile station identifier is mapped to the conference bridge identifier that has been assigned to that multi-mode mobile station.

A call control system may facilitate the routing of calls to or from multi-mode mobile stations through their associated conference bridges. For example, when a request is made to establish a call between an endpoint and a multi-mode mobile station, whether originated by the endpoint or by the multi-mode mobile station, the call control system may query the database to determine what conference bridge identifier is assigned to that multi-mode mobile station. The call control system may then route that call through the conference bridge associated with the multi-mode mobile station. In this way, when the call is established between the multi-mode mobile station and the endpoint, the voice or other media for the call is conveyed via the conference bridge. Thus, if the call is established via the first wireless network, the call is established with a first call leg that extends from the conference bridge to the multi-mode mobile station via the first wireless network.

At some point during the call, the multi-mode mobile station may request a handoff. This may occur, for example, when the multi-mode mobile is engaged in a call via the first wireless network but determines that the second wireless network is available and preferred. For example, the multi-mode mobile station may be moving out of the coverage area of the first wireless network and into the coverage area of the second wireless network.

The multi-mode mobile station may then request a handoff by making a handoff call to a predetermined handoff number via the second wireless network. The handoff number is such that the call control system receives the signaling to establish the handoff call. In response to this signaling, the call control system queries the database to determine what conference bridge identifier is assigned to the multi-mode mobile station. The call control system then uses the conference bridge identifier to route the handoff call to the conference bridge associated with the multi-mode mobile station. In this way, a second call leg is established between the conference bridge and the multi-mode mobile station via the second wireless network. Moreover, the conference bridge bridges the first and second call legs so that voice or other media from the endpoint is conveyed to the multi-mode mobile station over both call legs, and the multi-mode mobile station can send voice or other media to the endpoint via either call leg.

With the first and second call legs bridged in this way, the multi-mode mobile station can use either the first or the second call leg to send and/or receive voice or other media. However, once the multi-mode mobile station determines that the second call leg is fully operational (e.g., by receiving media via its second interface), the multi-mode mobile station may drop the first call leg. In this way, a handoff from the first wireless network to the second wireless network is effected. In addition, because the second call leg is established before the first call leg is dropped, this approach can beneficially effect a "soft" handoff between the first and second wireless networks.

In addition to facilitating handoffs, the conference bridges can be used to facilitate the process of re-establishing unintentionally dropped calls. For example, a call between a multi-mode mobile station and an endpoint may be established via an endpoint as described above. At some point during the call, the multi-mode mobile station's call leg may be unintentionally dropped, because of a temporary degradation in signal quality or for some other reason. The multi-mode mobile station detects the dropped call leg and, in response, calls a predetermined re-establishment number. The reestablishment number could be the same directory number as the handoff number, or it could be a different directory number. The call control system receives the signaling for the re-establishment call, identifies the multi-mode station's conference bridge, and routes the re-establishment call to the identified conference bridge. In this way, the multi-mode mobile station's call leg can be re-established. In addition, an announcement may be played to the endpoint, in order to provide notification that the multi-mode mobile station is attempting to re-connect and/or to fill up the time required to re-establish the dropped call leg.

2. Exemplary Network Architecture

FIG. 1 is a simplified block diagram of an exemplary wireless telecommunications system 10. In FIG. 1, connections that carry primarily voice or other media are shown as solid lines and connections that carry primarily signaling are shown as dashed lines.

Wireless telecommunications system 10 includes network elements that function together as a wireless local area network (WLAN) 12 and network elements that function together as a wireless local area network (WWAN) 14. WLAN 12 may provide wireless coverage in a relatively limited area, such as in a building or part of a building. In addition, WLAN 12 may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, IEEE 802.11h, or IEEE 802.11n (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multichannel Multipoint Distribution Service (MMDS), or some other wireless protocol or format for wireless communication.

WWAN 14 may provide wireless coverage in a relatively large geographic area, such as an entire city, often by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. Thus, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14.

Multi-mode mobile station 16 may be a wireless telephone, wirelessly-equipped personal digital assistant (PDA), wirelessly-equipped laptop computer, or other type of wireless communication device. The first and second interfaces of multi-mode mobile station 16 may each include an antenna, a radio frequency (RF) transceiver, and a communication module appropriate for communicating using the particular wireless technology. A communication module may be implemented by hardware, firmware, and/or software.

WLAN 12 includes at least one wireless access point 18. Wireless access point 18 provides a wireless coverage area within which wireless access point 18 is able to communicate with wireless communication devices, such as multi-mode mobile station 16, over an air interface 20. Wireless access point 18 may be communicatively coupled to other network elements, e.g., via a local area network (LAN) 22. LAN 22 may carry voice, data, and/or other media in a packet-based format. Thus, LAN 22 may be connected to other communication devices that exchange voice in a packet-based format. For example, LAN 22 may be connected to a voice-over-packet (VoP) telephone 24, a personal computer 26 equipped for audio communication, e.g., equipped with a microphone and speaker, and/or one or more other wireless access points.

LAN 22 may also be connected to a VoP system 28 that controls VoP communications in WLAN 12. VoP system 28 may, for example, function as a private branch exchange, such as an "IP-PBX," and/or a media terminal adapter (MTA). VoP system 28 may, in turn, be communicatively coupled to a variety of wireline and/or wireless communication devices. For example, VoP system 28 may be connected to analog telephony devices, such as analog telephone 30, facsimile machines, and/or modems. VoP system 28 may also be connected to digital telephony devices, such as digital telephone 32.

LAN 22 may be communicatively coupled to a wide area packet-switched network 34, via a network access device 36. Network access device 36 could be, for example, a cable modem, DSL modem, or router. Packet-switched network 34 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 34 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 34. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 34 that involve WLAN 12. WLAN 12 may include one or more SIP user agents for this SIP signaling. For example, VoP system 28 may include a SIP user agent to engage in SIP signaling on behalf of multi-mode mobile station 16 or other communication devices communicatively coupled to WLAN 12. Alternatively, multi-mode mobile station 16 may have its own SIP user agent.

WWAN 14 may include a base transceiver station (BTS) 38 that provides a wireless coverage area within which BTS 38 may communicate with one or more mobile stations, such as multi-mode mobile station 16, over an air interface 40. Although FIG. 1 shows only one BTS, it is to be understood that WWAN 14 may include a plurality of BTSs that may provide a plurality of wireless coverage areas. The communications between BTS 38 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 38 may be controlled by a base station controller (BSC) 42, which, in turn, may be controlled by a mobile switching center (MSC) 44. Although FIG. 1 shows only one MSC and only one BSC, it is to be understood that WWAN 14 may include a plurality of MSCs, which may, in turn, control a plurality of BTSs, via a plurality of BSCs. MSC 44 also has access to a visitor location register (VLR) 46. VLR 46 stores data records for mobile stations, such as multi-mode mobile station 16, that are being served by MSC 44. A data record stored in VLR 46 for a mobile station may identify the mobile station, e.g., by mobile directory number (MDN), mobile station identification (MSID), and/or electronic serial number (ESN). The data record may also include status information for the mobile station, such as whether the mobile station is busy, and may also include a service profile that identifies the services to which the mobile station subscribes. The data record may also include other information relating to the mobile station. Although FIG. 1 shows VLR 46 as a network element separate from MSC 44, VLR 46 may be integrated or co-located with MSC 44.

WWAN 14 may also include a home location register (HLR) 48 that stores a data record for multi-mode mobile station 16. The data record stored in HLR 48 for multi-mode mobile station 16 may identify multi-mode mobile station 16, such as by MDN, MSID, and/or ESN and may include a last known location of multi-mode mobile station 16. For example, the data record may identify the VLR that most recently registered multi-mode mobile station 16 with HLR 48. The data record may also include status information for multi-mode mobile station 16, a service profile for multi-mode mobile station 16, and other information relating to multi-mode mobile station 16.

MSC 44 is connected to the public switched telephone network (PSTN) 50. PSTN 50 may use an out-of-band signaling system, such as Signaling System 7 (SS7) to route calls. Thus, PSTN 50 may include a circuit-switched network 52 that carries bearer traffic, i.e., the voice or other media in calls, and a signaling network 54 that carries signaling traffic used to set up, tear down, monitor, and control calls. Circuit-switched network 52 may include a plurality of trunks, with each trunk carrying media in a time division multiplex (TDM) format. Signaling system 54 may include a plurality of networked signal transfer points (STPs).

PSTN 50 may also be connected to various landline telephony endpoints, exemplified in FIG. 1 by landline telephone 56. More particularly, landline telephone 56 may be connected to a switching system, such as service switching point (SSP) 58, which, in turn, may have a bearer connection to circuit-switched network 52 and a signaling connection to signaling network 54.

MSC 44 may communicate with signaling network 54, e.g., using SS7, to route calls via circuit-switched network 52 to and from mobile stations being served by WWAN 14, such as multi-mode mobile station 16. To provide telecommunications services to mobile stations being served by WWAN 14, such as multi-mode mobile station 16, MSC 44 may also communicate with HLR 48 via signaling network 54. The communications between MSC 44 and HLR 48 may conform to IS-41 specifications. A recent revision of the IS-41 specifications, ANSI/TIA/EIA-41-D-97, published in December 1997, is incorporated herein by reference. The IS-41 signaling may be carried in signaling network 54 as an SS7 application layer.

Packet-switched network 34 may be communicatively coupled to circuit-switched network 52, via a media gateway 60. Media gateway 60 may convert between media formats used in circuit-switched network 52 and packet-switched network 34. For example, media gateway 60 may receive media from circuit-switched network 52 in a TDM format and convert the media into an RTP format for transmission over packet-switched network 34, and vice-versa. Media gateway 60 may also be connected to, or integrated with, MSCs, such as MSC 44. Thus, MSC 44 may have a bearer connection with media gateway 60 via an intermachine trunk 62.

A media server 64 may also be communicatively coupled to packet-switched network 34. Media server 64 provides a plurality of conference bridges, such as conference bridges 66, 68, and 70, each of which may be able to bridge three or more call legs that extend through packet-switched network 34 as three or more media streams (e.g., in an RTP format).

For example, with multi-mode mobile station 16 involved in a call with an endpoint, conference bridge 66 might bridge together: (i) a first call leg that extends from media server 64 to multi-mode mobile station 16 via packet-switched network 34, WLAN 12, and air interface 20; (ii) a second call leg that extends from media server 64 to multi-mode mobile station 16 via packet-switched network 34, media gateway 60, circuit-switched network 52, WWAN 14, and air interface 40; and (iii) a third call leg that extends from the endpoint, e.g., landline telephone 56, to media server 64 via SSP 58, circuit-switched network 52, media gateway 60, and packet-switched network 34.

Although FIG. 1 shows three conferences bridges in media server 64, it is to be understood that media server 64 could include a greater or fewer number of conference bridges. In addition, conference bridges 66, 68, and 70 could be provided by one or more other network elements. For example, conference bridges 66, 68, and 70 could be provided by a media resource function (MRF) or by a media gateway.

Each conference bridge in media server 64 may be associated with a particular multi-mode mobile station. More particularly, each conference bridge may be given a conference bridge identifier that is, in turn, assigned to a particular multi-mode mobile station. For example, conference bridge 66 might be associated with multi-mode mobile station 16. As described in more detail, this association may result in having all calls to or from multi-mode mobile 16 station routed through conference bridge 66.

Wireless telecommunications system 10 may include a conference bridge identifier (CBI) database 72 that keeps track of which conference bridges are assigned to which multi-mode mobile stations. For example, CBI database 72 may store conference bridge identifiers of the conference bridges provided by media server 64 and may store mobile station identifiers of multi-mode mobile stations so that the mobile station identifiers are mapped to the conference bridge identifiers of their associated conference bridges. Such mobile station identifiers may include, for example, MDN, MSID, and/or ESN. In this way, a mobile station identifier of a multi-mode mobile station may be used to query CBI database 72 and obtain the conference bridge identifier of the conference bridge associated with that multi-mode mobile station.

CBI database 72 may be communicatively coupled to packet-switched network 34, as shown in FIG. 1. Alternatively, CBI database 72 could be provided in telecommunications system 10 in other ways. For example, CBI database 72 could be integrated into a network element such as a home subscriber server (HSS).

Media server 64 could be controlled by a call control system 74 that functions to route calls to and from multi-mode mobile stations through their associated conference bridges in media server 64, for example, via packet-switched network 34, PSTN 50, and media gateway 60. Call control system 74 may include a number of functional components, such as a media controller 76, a SIP server 78, a signaling gateway 80, and an IP VLR 82. These components may be provided in a single network element, such as softswitch or a call session control function (CSCF). Alternatively, these components may be distributed among multiple network elements.

Media controller 76 may function to control media gateway 60, for example, to extend calls from PSTN 50 to packet-switched network 34, or vice versa, and may function to control media server 64 to set up specific conference bridges for calls to and from their associated multi-mode mobile stations. Media controller 76 may communicate with media gateway 60 and media server 64 via signaling links, e.g., using the Media Gateway Control Protocol (MGCP), H.248/ Megaco, SIP, VoiceXML, and/or other protocols.

SIP server 78 may communicate with SIP user agents (which may be included in multi-mode mobile stations or in other network elements, such as VoP system 28, that act on behalf of multi-mode mobile station) to set up and control voice calls and other communication sessions through packet-switched network 34. For example, SIP server 78 may function as a SIP registrar that registers SIP user agents through the use of the SIP REGISTER method. SIP server 78 may also function as a SIP proxy server, e.g., to set up communication sessions using the SIP INVITE method.

Signaling gateway 80 functions to convert between the signaling format used in packet-switched network 34, e.g., SIP, and the signaling format used in signaling network 54, e.g., SS7 and IS-41. Thus, using signaling gateway 80, call control system 74 can route calls that originate from PSTN 50 through packet-switched network 34 and can route calls that originate from packet-switched network 34 through PSTN 50.

IP VLR 82 serves as a visitor location register for packet-switched network 34, storing a data record for each multi-mode mobile station that has registered via packet-switched network 34. More particularly, when a multi-mode mobile station associates with WLAN 12, the multi-mode mobile station may register for services via packet-switched network 34, e.g., by sending a SIP REGISTER message to SIP server 78. In response, call control system 74 may obtain a data record for that multi-mode mobile station from HLR 48, e.g., by having signaling gateway 80 send an IS-41 REGNOT message to HLR 48, and then store that data record in IP VLR 82. In this way, IP VLR 82 keeps track of which multi-mobile stations are currently being served by WLAN 12.

3. Exemplary Operation

Figure 2:
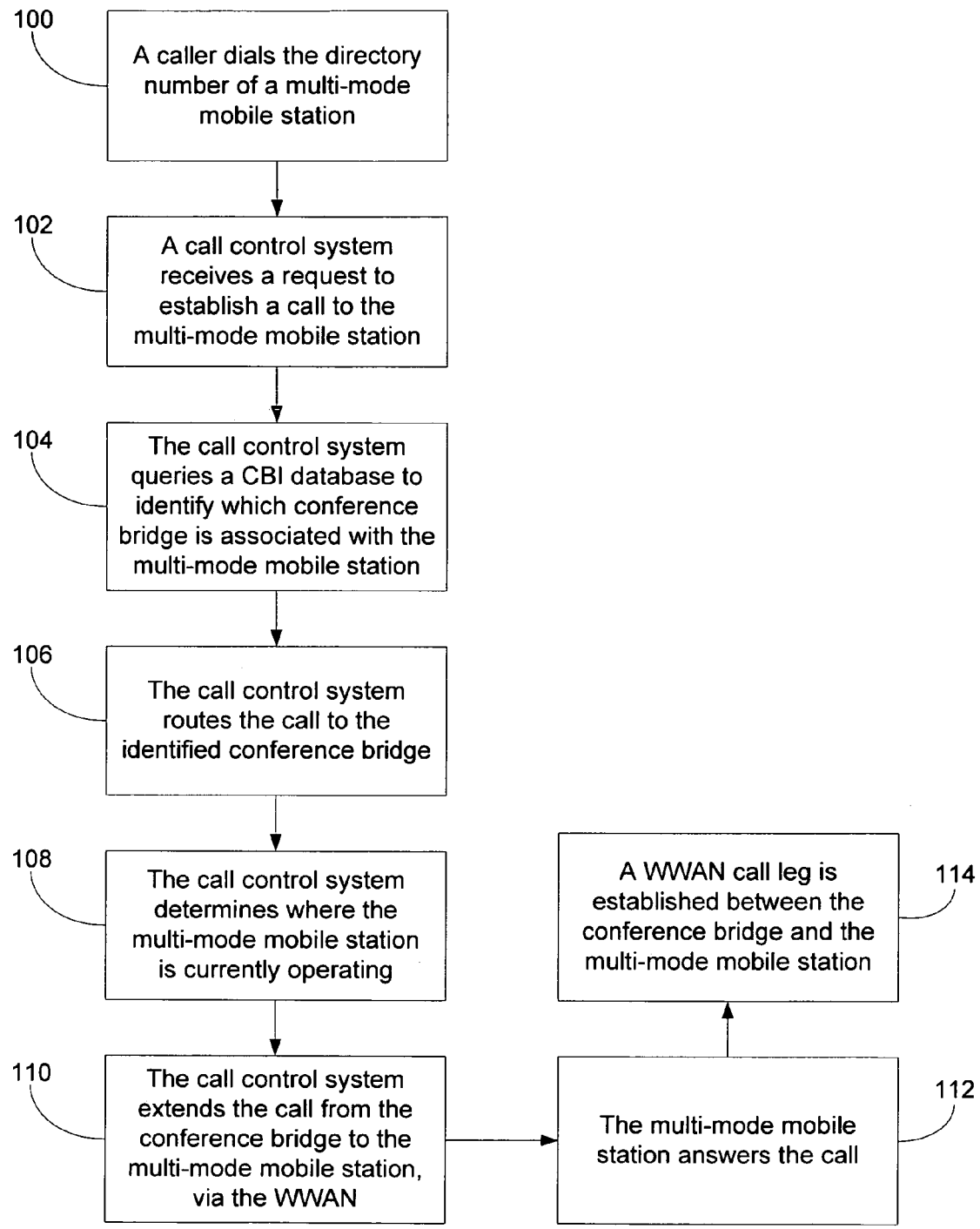
FIG. 2 is a flow chart illustrating a method for establishing a call between an endpoint and a multi-mode mobile station via a WWAN, in accordance with an exemplary embodiment of the present invention.
Figure 3:
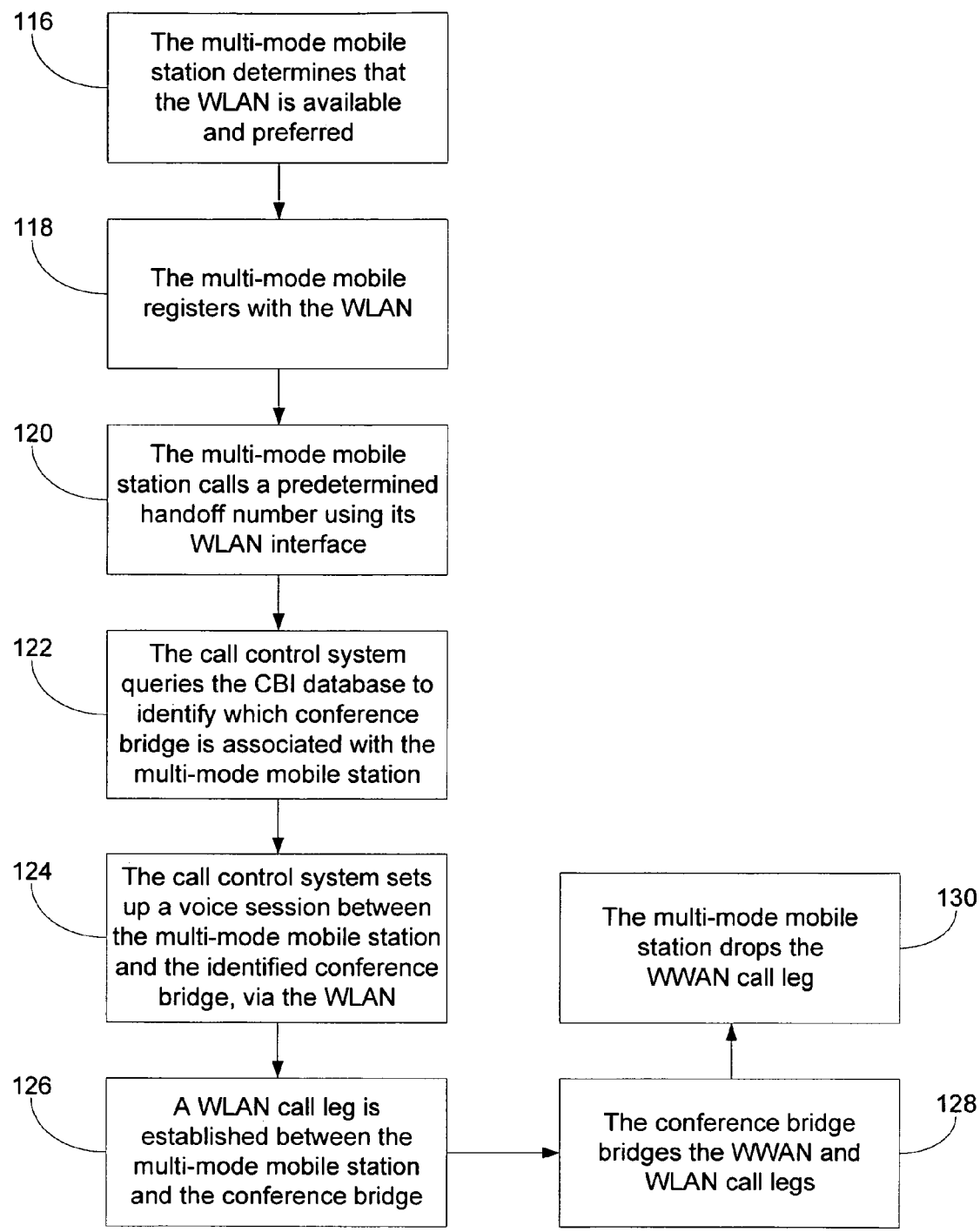
FIG. 3 is a flow chart illustrating a method for handing off the call established in FIG. 2 from the WWAN to a WLAN, in accordance with an exemplary embodiment of the present invention.
Figure 4:
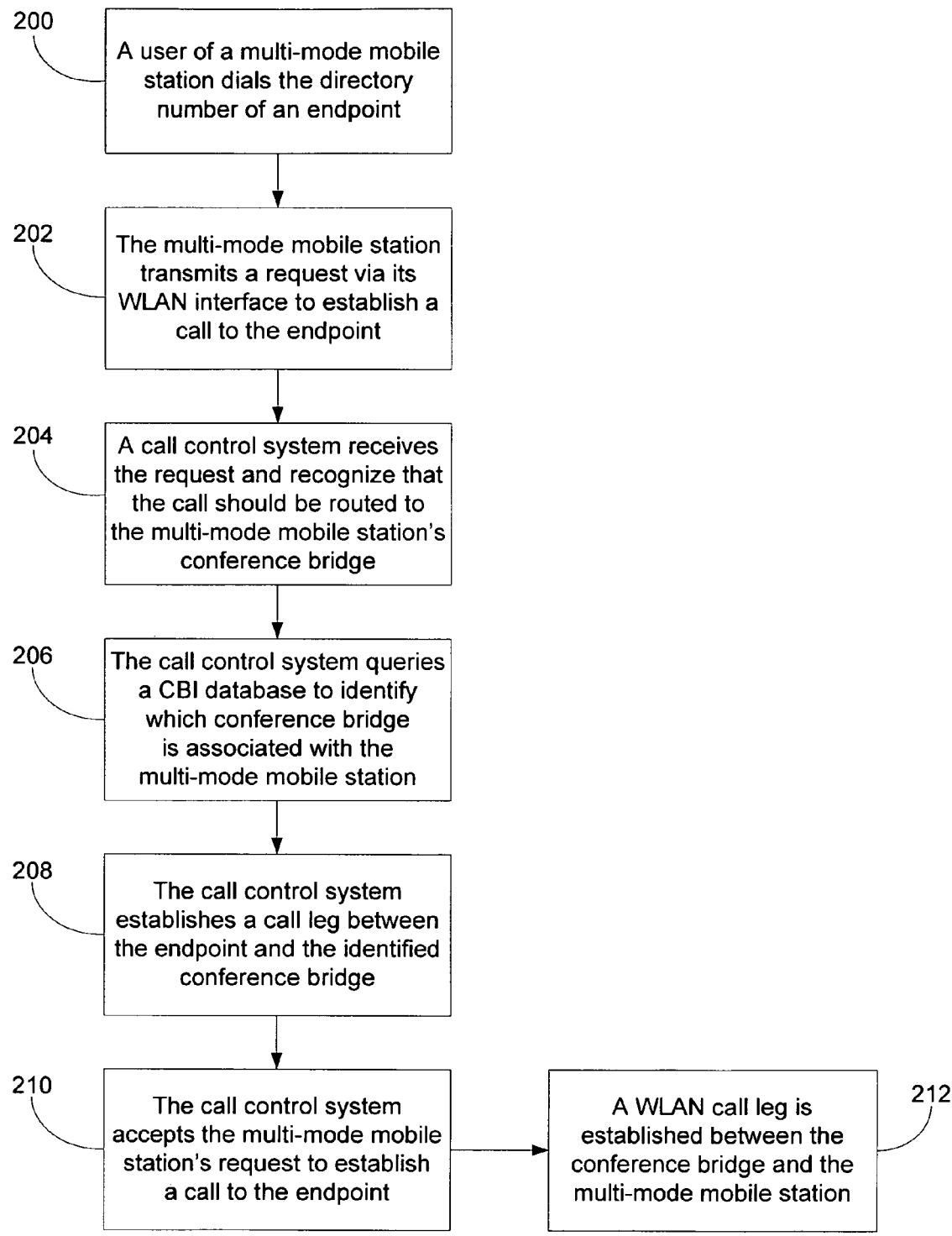
FIG. 4 is a flow chart illustrating a method for establishing a call between a multi-mode mobile station and an endpoint via a WLAN, in accordance with an exemplary embodiment of the present invention.
Figure 5:
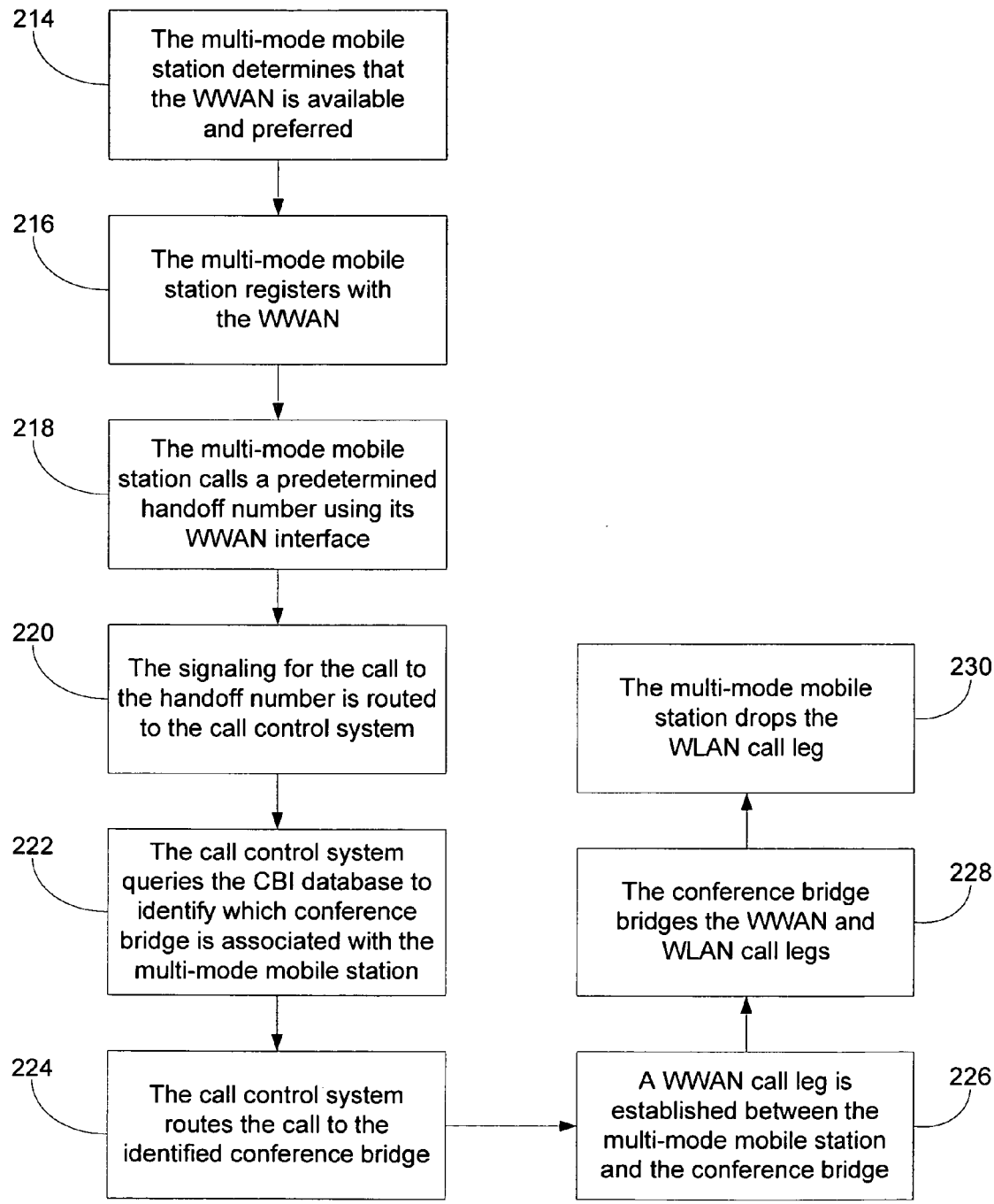
FIG. 5 is a flow chart illustrating a method for handing off the call established in FIG. 4 from the WLAN to a WWAN, in accordance with an exemplary embodiment of the present invention.
Figure 6:
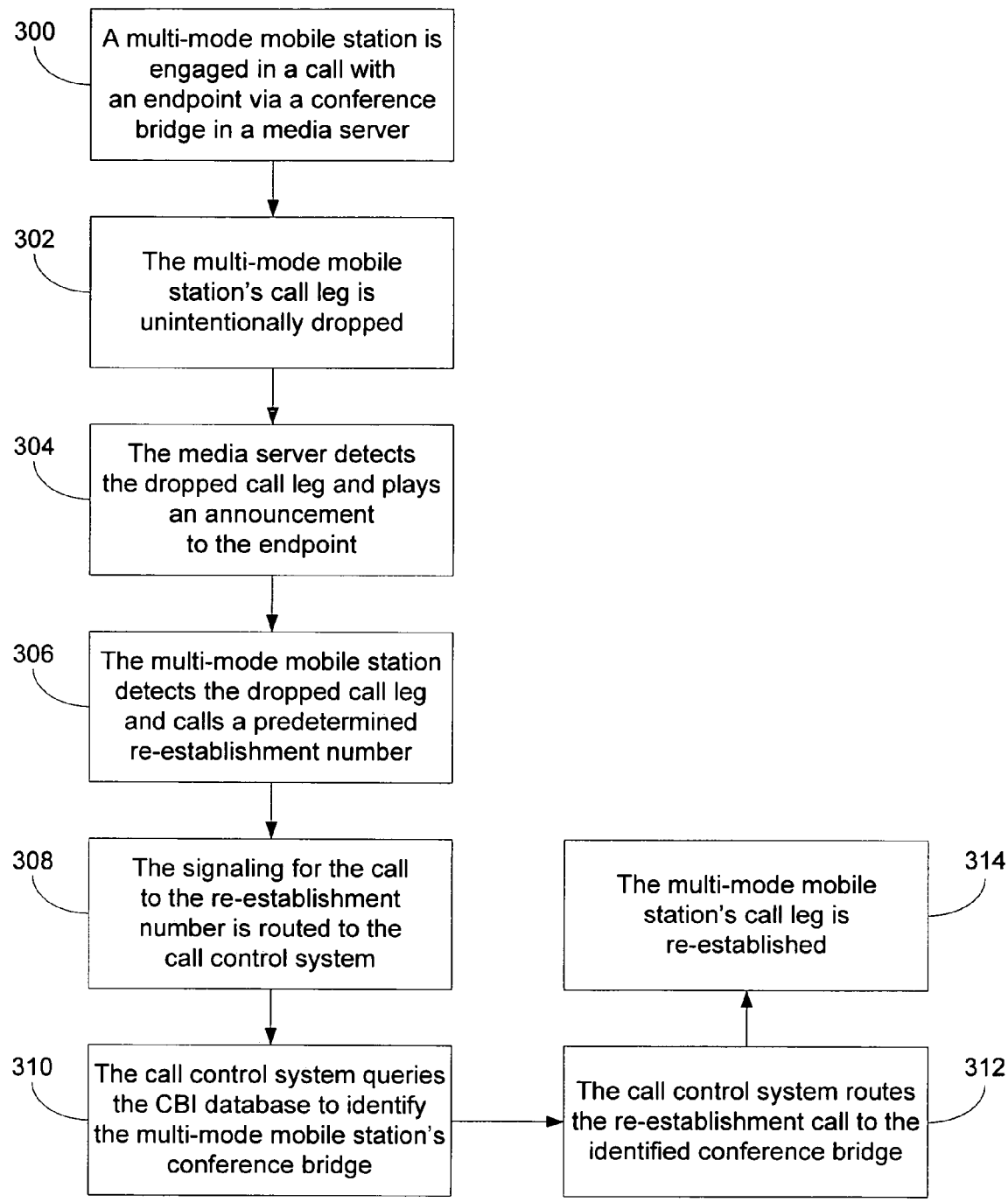
FIG. 6 is a flow chart illustrating a method for re-establishing a dropped call leg, in accordance with an exemplary embodiment of the present invention.

FIGS. 2-6 are flow charts illustrating exemplary methods of operation. More particularly, FIG. 2 illustrates an exemplary method of establishing a call from an endpoint to a multi-mode mobile station via a WWAN, using the conference bridge associated with the multi-mode mobile station. FIG. 3 illustrates an exemplary method of effecting a handoff of the WWAN call established as in FIG. 2 so that the call continues over a WLAN. FIG. 4 illustrates an exemplary method of establishing a call originated by the multi-mode mobile station via a WLAN, using the conference bridge associated with the multi-mode mobile station. FIG. 5 illustrates an exemplary method of effecting a handoff of the WLAN call established as in FIG. 4 so that the call continues over the WWAN. FIG. 6 illustrates an exemplary method of using the conference bridge to re-connect the multi-mode mobile station when its call leg has been unintentionally dropped. The examples of FIGS. 2-6 assume the network architecture of FIG. 1. However, it is to be understood that other network architectures could be used.

With reference to FIG. 2, an exemplary process may begin when a caller dials a directory number associated with a multi-mode mobile station (e.g., its MDN), as indicated by block 100. For purposes of illustration, it will be assumed that the caller is calling from a landline station, e.g., landline telephone 56 in FIG. 1. However, it is to be understood that the caller could also be calling from a mobile station (via either a WWAN or a WLAN), from a wireline station coupled to a packet-switched network, or from some other endpoint.

A call control system then receives a request to establish the call to the multi-mode mobile station, as indicated by block 102. The request may take the form of call set-up signaling, such as SS7 signaling for calls from PSTN 50 or SIP signaling for calls from packet-switched network 34. Thus, if landline telephone 56 is originating the call, SSP 58 may generate an SS7 IAM message that identifies the multi-mode mobile station, e.g., by its MDN, as the called party. Signaling gateway 80 in call control system 74 may then receive the SS7 IAM message via signaling network 54.

In response to this request, the call control system queries a CBI database to identify which conference bridge is associated with the called multi-mode mobile station, as indicated by block 104. For example, call control system 74 may send a query to CBI database 72 that identifies the called multi-mode mobile station, e.g., by its MDN. CBI database 72 may then perform a look-up and respond with a conference bridge identifier that identifies the conference bridge that has been assigned to the multi-mode mobile station.

The call control system then routes the call to the identified conference bridge, as indicated by block 106. For example, if conference bridge 66 is to be used for the call, media controller 76 of call control system 74 may signal to media server 64 to prepare conference bridge 66 for the call. In this signaling, media controller 76 may specify that conference bridge 66 is to be used by providing the conference bridge identifier obtained from CBI database 72.

The call control system may also determine where the called multi-mode mobile station is currently operating, as indicated by block 108. For example, call control system 74 may determine whether the called multi-mode mobile station is currently being served by WLAN 12 or by WWAN 14. To do this, signaling gateway 80 may send an IS-41 LOCREQ message to HLR 48.

In this example, the called multi-mode mobile station is being served by WWAN 14. Thus, in response to the IS-41 LOCREQ message, HLR 48 checks its data record for the called multi-mode mobile station and thereby determines that the called multi-mode mobile station is currently being served by MSC 44. HLR 48 then sends an IS-41 ROUTEREQ message to MSC 44 to obtain a temporary local directory number (TLDN) and forwards this TLDN to signaling gateway 80 in response to the LOCREQ message.

Once the called multi-mode mobile station is located, the call control system extends the call from the conference bridge to the called multi-mode mobile station, via the WWAN, as indicated by block 110. For example, media controller 76 may signal to media gateway 60 and media server 64 to set up a voice session through packet-switched network 34, and signaling gateway 80 may use the TLDN from the LOCREQ response to route the call through signaling network 54 (e.g., in an SS7 IAM message) from media gateway 60 to MSC 44.

The WWAN receives the signaling to terminate the call to the multi-mode mobile station and, in response, notifies the multi-mode mobile station of the incoming call (i.e., pages and alerts the multi-mode mobile station). The multi-mode mobile station may then answer the call, as indicated by block 112. In this way, a WWAN call leg is established between the conference bridge and the called multi-mode mobile station, as indicated by block 114, through which the multi-mode mobile station and endpoint can exchange voice or other media via the WWAN. Thus, landline telephone 56 and conference bridge 66 can exchange media via SSP 58, circuit-switched network 52, media gateway 60, and packet-switched network 34, and conference bridge 66 and multi-mode mobile station 16 can exchange media via packet-switched network 34, media gateway 60, circuit-switched network 52 (or IMT 62), WWAN 14, and air interface 40.

FIG. 3 illustrates an exemplary process for effecting a handoff from the WWAN to the WLAN. At some point during the call, the multi-mode mobile station may determine that a different wireless network (e.g., WLAN 12) is available and preferred, as indicated by block 116. The multi-mode mobile station may use any of various methods to determine when to check for availability of the other wireless network. In some cases, the multi-mode mobile station may periodically check for availability, or it may do so at the instance of the user. Alternatively, a triggering event may cause the multi-mode mobile station to determine that it should check for availability of the second wireless network. For example, the multi-mode mobile station may use information about its location or movement to determine when to check for availability of the second wireless network. Examples of such approaches are described in U.S. patent application Ser. No. 10/391,158, filed Mar. 18, 2003, titled "Method for Determining Availability of a Radio Network," in U.S. patent application Ser. No. 10/629,406, filed Jul. 29, 2003, titled "Method for Determining Availability of a Radio Network," and in U.S. patent application Ser. No. 10/980,727, titled "Method and System for Triggering Events in a Wireless Network," filed Nov. 3, 2004, which applications are incorporated herein by reference.

Once the multi-mode mobile station determines that the other wireless network is available, the multi-mode mobile station may then determine whether it is preferred. The determination that the other wireless network is preferred could be based on pre-set preferences and/or could depend on various criteria, such as the quality of the link and/or the availability of desired services (e.g., voice service) using the other wireless network.

In response to the determination that the WLAN is available and preferred, the multi-mode mobile station registers with the WLAN, as indicated by block 118. For example, the multi-mode mobile station may transmit a SIP REGISTER message to SIP server 78. The multi-mode mobile station then calls a predetermined handoff number using its WLAN interface, as indicated by block 120. If the multi-mode mobile station includes a SIP user agent, the multi-mode mobile station may do this by sending SIP server 78 a SIP INVITE message with a Request-URI that includes the handoff number. If the multi-mode mobile station does not include a SIP user agent, the multi-mode mobile station may use a different protocol to send a message to a network element that does include a SIP user agent (e.g., VoP system 28), which then sends a SIP INVITE message on behalf of the multi-mode mobile station.

The call control system recognizes from the handoff number specified in the SIP INVITE message that the caller is a multi-mode mobile station, with an associated conference bridge, that is requesting a handoff. The call control system then queries the CBI database to identify which conference bridge is associated with the multi-mode mobile station, as indicated by block 122. For example, call control system 74 may send CBI database 72 a query that includes an identifier of the multi-mode mobile station (e.g., an MDN, MSID, or ESN) obtained from the SIP INVITE message. CBI database 72 may then respond with a conference bridge identifier that identifies the multi-mode mobile station's designated conference bridge, e.g., conference bridge 66.

The call control system then sets up a voice session between the identified conference bridge and the multi-mode mobile station via the WLAN, as indicated by block 124. To do this, media controller 76 may communicate with media server 64 to prepare conference bridge 66 for the voice session, and SIP server 78 may respond to the SIP INVITE message with a 200 OK message. In this way, a WLAN call leg is established between the multi-mode mobile station and its associated conference bridge, as indicated by block 126, through which the multi-mode mobile station and the endpoint can exchange voice and/or other media. Thus, landline telephone 56 and conference bridge 66 can exchange media via SSP 58, circuit-switched network 52, media gateway 60, and packet-switched network 34, and conference bridge 66 and multi-mode mobile station 16 can exchange media via packet-switched network 34, WLAN 12, and air interface 20.

Moreover, the conference bridge bridges the WWAN and WLAN call legs, as indicated by block 128. In particular, the conference bridge mixes the voice or other media for the WWAN and WLAN call legs, so that media transmitted by the endpoint is sent to the multi-mode mobile station via both the WWAN and the WLAN call legs, and media that the multi-mode mobile station transmits over either call leg is sent to the endpoint.

At some point, for example, when the multi-mode mobile station starts receiving media via its WLAN interface, the multi-mode mobile station drops the WWAN call leg, e.g., by transmitting a release message, as indicated by block 130. In this way, the conference bridge can beneficially facilitate a soft handoff between the WWAN and the WLAN.

Calls originating from multi-mode mobile stations may also be routed through their respective conference bridges, as illustrated in FIGS. 4 and 5. For purposes of illustration, the multi-mode mobile station is currently being served by a WLAN, e.g., WLAN 12, in the example of FIGS. 4 and 5. With reference to FIG. 4, the process may begin when the user of a multi-mode mobile station dials the directory number of an endpoint, e.g., landline telephone 56, as indicated by block 200.

In response, the multi-mode mobile station transmits a request, via its WLAN interface, to establish a call to the endpoint, as indicated by block 202. For example, the multi-mode mobile station may transmit (or another network element may transmit on behalf of the multi-mode mobile station) a SIP INVITE message to SIP server 78. The SIP INVITE message may include a Request-URI that identifies the endpoint and may identify the calling multi-mode mobile station, e.g., by MDN, MSID, or ESN.

A call control system receives the request and recognizes (e.g., from an identification of the multi-mode mobile station contained in the request) that the call should be routed through the conference bridge that is associated with the multi-mode mobile station, as indicated by block 204. To identify which conference bridge is associated with the multi-mode mobile station, the call control system queries a CBI database, as indicated by block 206. For example, call control system 74 may send CBI database 72 a query that identifies the calling multi-mode mobile station, and CBI database 72 may respond with a conference bridge identifier that specifies what conference bridge to use for the call, e.g., conference bridge 66.

The call control system then establishes a call leg between the endpoint and the identified conference bridge, as indicated by block 208. For example, media controller 76 may signal to media server 64 to prepare conference bridge 66 for the call, and signaling gateway 80 may transmit an SS7 IAM message through signaling network 54 to route the call to the called endpoint, e.g., landline telephone 56.

Once the called endpoint answers, the call leg between the called endpoint and the conference bridge is completed. The call control system then accepts the multi-mode mobile station's request to establish a call to the endpoint, as indicated by block 210. For example, the call control system may send a SIP 200 OK message to the multi-mode mobile station, which may then respond with an ACK acknowledgement. In this way, a WLAN call leg is established between the conference bridge and the multi-mode mobile station, as indicated by block 212, through with the multi-mode mobile station and the called endpoint can exchange voice or other media. Thus, once the call to landline telephone 56 is established, landline telephone 56 and conference bridge 66 can exchange media via SSP 58, circuit-switched network 52, media gateway 60, and packet-switched network 34, and conference bridge 66 and multi-mode mobile station 16 can exchange media via packet-switched network 34, WLAN 12, and air interface 20.

FIG. 5 illustrates an exemplary process for effecting a handoff from the WLAN to the WWAN. At some point during the call, the multi-mode mobile station determines that the WWAN is available and preferred, as indicated by block 214. In response, the multi-mode mobile station registers with the WWAN, as indicated by block 216. For example, if the multi-mode mobile station is an area served by MSC 44, then the multi-mode mobile station may transmit a registration message and MSC 44 may responsively send an IS-41 REGNOT message to HLR 48. The multi-mode mobile station then calls a predetermined handoff number using its WWAN interface, as indicated by block 218. The signaling for the call to the handoff number is routed to the call control system, as indicated by block 220. For example, MSC 44 may generate an SS7 IAM message that identifies the handoff number as the called number. Signaling network 54 may then route the SS7 LAM message to signaling gateway 80, e.g., based on a point code for signaling gateway 80 that is associated with the handoff number.

The call control system receives this signaling and recognizes (e.g., from an identification of the multi-mode mobile station) that the call should be routed through the multi-mode mobile station's conference bridge. To identify which conference bridge is associated with the multi-mode mobile station, the call control system queries the CBI database, as indicated by block 222. The call control system then routes the call to the identified conference bridge, as indicated by block 224.

In this way, a WWAN call leg is established between the multi-mode mobile station and the conference bridge, as indicated by block 226, through which the multi-mode mobile station and the called endpoint can exchange voice or other media. Moreover, the conference bridge bridges the WWAN and WLAN call legs, as indicated by block 228. As a result, the multi-mode mobile station can receive media from the endpoint via either call leg and can transmit media to the endpoint via either call leg.

At some point, for example, when the multi-mode mobile station starts receiving media via its WWAN interface, the multi-mode mobile station drops the WLAN call leg, as indicated by block 230, e.g., by de-registering with SIP server 78. To de-register, multi-mode mobile station 16 may, for example, transmit a SIP REGISTER message with an expiration period of 0. The multi-mode mobile station may do this, for example, when it begins to receive media via its WWAN interface. Alternatively, the multi-mode mobile station may transmit a SIP BYE message.

Once the WLAN call leg is dropped, the multi-mode mobile station continues using the WWAN call leg for the call. In this way, a soft handoff from the WLAN to the WWAN may be effected.

The approach of routing calls to and from a multi-mode mobile station through its associated conference bridge can also facilitate the process of re-connecting the multi-mode mobile station when its call leg has been unintentionally dropped, as illustrated in FIG. 6. The process may begin when the multi-mode mobile station is engaged in a call with an endpoint via a conference bridge in a media server, as indicated by block 300. Thus, the call includes an endpoint call leg that extends between the endpoint and the conference bridge and a multi-mode mobile station call leg that extends between the multi-mode mobile station and the conference bridge. The call may have been originated by either the multi-mode mobile station or the endpoint. In addition, the multi-mode mobile station may be involved in the call via either the WWAN or the WLAN. Thus, the call could have been established as set forth in FIG. 2 or FIG. 4.

At some point during the call, the multi-mode mobile station's call leg is unintentionally dropped, as indicated by block 302. This may occur, for example, because of a temporary degradation in signal quality or for some other reason. The media server may detect the dropped call leg and, in response, may play an announcement to the endpoint, as indicated by block 304. The announcement could be, for example, a pre-recorded or speech-synthesized message asking the party at the endpoint to please hold because the other party has been dropped from the call and is attempting to re-connect. The announcement may be chosen so as to fill up the expected amount of time needed for the multi-mode mobile station to re-connect. In this regard, the media server may allow the multi-mode mobile station a predetermined period of time, e.g., 15 seconds, within which to re-connect before releasing the endpoint's call leg.

The multi-mode mobile station also detects the dropped call leg and, in response, calls a predetermined re-establishment number, as indicated by block 306. The re-establishment number could be, for example, the same directory number as the handoff number. The multi-mode mobile station could transmit the call re-establishment request via the same wireless network as the dropped call leg. Alternatively, if the other wireless network is available, then the multi-mode mobile station may register with the other wireless network and then transmit the call re-establishment request.

The signaling for the call to the re-establishment number is routed to the call control system, as indicated by block 308. The call control system then queries the CBI database to identify the multi-mode mobile station's conference bridge, as indicated by block 310. For example, call control system 74 may send CBI database 72 a query that includes an identifier of the multi-mode mobile station (e.g., an MDN, MSID, or ESN) that the multi-mode mobile station included in its call re-establishment request. CBI database 72 may respond with a conference bridge identifier that identifies the multi-mode mobile station's designated conference bridge, i.e., the conference bridge being used for the call. The call control system then routes the re-establishment call to the identified conference bridge, as indicated by block 312. In this way, the multi-mode mobile station's call leg is re-established, as indicated by block 314.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for effecting a handoff of a multi-mode mobile station from a first wireless network to a second wireless network, said multi-mode mobile station having a first interface for wireless communication with said first wireless network and a second interface for wireless communication with said second wireless network, said method comprising:

receiving a call request that requests establishment of a call between said multi-mode mobile station and an endpoint;

in response to said call request, identifying a conference bridge, from among a plurality of conference bridges, that is associated with said multi-mode mobile station;

establishing a first call leg between said conference bridge and said multi-mode mobile station via said first wireless network;

receiving a handoff request;

in response to said handoff request, establishing a second call leg between said conference bridge and said multi-mode mobile station via said second wireless network, said conference bridge bridging said first and second call legs; and dropping said first call leg.

2. The method of claim 1, wherein said call request originates from said multi-mode mobile station.

3. The method of claim 1, wherein said call request originates from said endpoint.

4. The method of claim 1, wherein said first wireless network is a wireless local area network (WLAN) and said second wireless network is a wireless wide area network (WWAN).

5. The method of claim 4, wherein said first call leg extends from said conference bridge to said multi-mode mobile station via a packet-switched network and said second call leg extends from said conference bridge to said multi-mode mobile station via said packet-switched network, a media gateway, and a circuit-switched network.

6. The method of claim 1, wherein said first wireless network is a wireless wide area network (WWAN) and said second wireless network is a wireless local area network (WLAN).

7. The method of claim 6, wherein said first call leg extends from said conference bridge to said multi-mode mobile station via a packet-switched network, a media gateway, and a circuit-switched network, and said second call leg extends from said conference bridge to said multi-mode mobile station via a packet-switched network.

8. The method of claim 1, further comprising:

said multi-mode mobile station transmitting said handoff request via said second wireless network.

9. The method of claim 8, wherein said handoff request is a request to originate a call to a predetermined handoff number.

10. A method for communicating with multi-mode mobile stations that can communicate with at least a first wireless network and a second wireless network, said method comprising:

associating each one of a plurality of said multi-mode mobile stations with a particular one of a plurality of conference bridges;

receiving a call request that requests establishment of a call between an endpoint and a given one of said plurality of multi-mode mobile stations;

in response to said call request, identifying a given conference bridge, from among said plurality of conference bridges, that is associated with said given multi-mode mobile station; and establishing said call through said given conference bridge.

11. The method of claim 10, wherein associating each one of a plurality of said multi-mode mobile stations with a particular one of a plurality of conference bridges comprises:

defining a plurality of conference bridge identifiers, wherein each one of said conference bridge identifiers corresponds to a particular one of said plurality of conference bridges;

assigning to each one said plurality of multi-mode mobile stations a unique conference bridge identifier from among said plurality of conference bridge identifiers; and storing for each one of said plurality of multi-mode mobile stations an association between a mobile station identifier of said multi-mode mobile station and its conference bridge identifier.

12. The method of claim 11, wherein said call request identifies said given multi-mode mobile station by a given mobile station identifier.

13. The method of claim 12, wherein identifying a given conference bridge, from among said plurality of conference bridges, that is associated with said given multi-mode mobile station comprises:

determining which conference bridge identifier, from among said plurality of conference bridge identifiers, is associated with said given mobile station identifier of said given multi-mode mobile station, to obtain a given conference bridge identifier; and determining which conference bridge, from among said plurality of conference bridges, corresponds to said given conference bridge identifier.

14. The method of claim 13, wherein establishing said call through said given conference bridge comprises:

establishing a first call leg between said given conference bridge and said given multi-mode mobile station via said first wireless network.

15. The method of claim 14, further comprising:

receiving a handoff request that includes said given mobile station identifier of said given multi-mode mobile station.

16. The method of claim 15, further comprising, in response to said handoff request:

identifying said given conference bridge identifier from said given mobile station identifier;

identifying said given conference bridge from said given conference bridge identifier; and establishing a second call leg between said given conference bridge and said given multi-mode mobile station via said second wireless network, said given conference bridge bridging said first and second call legs.

17. The method of claim 14, further comprising:

said given multi-mode mobile station detecting that said first call leg has been dropped and responsively transmitting a call re-establishment request that includes said given mobile station identifier of said given multi-mode mobile station;

identifying said given conference bridge identifier from said given mobile station identifier;

identifying said given conference bridge from said given conference bridge identifier; and re-establishing said first call leg between said given conference bridge and said given multi-mode mobile station via either of said first and second wireless networks.

18. A system for providing wireless telecommunications for a plurality of multi-mode mobile stations, comprising:

a first wireless network;

second wireless network;

a plurality of conference bridges communicatively coupled to said first and second wireless networks;

a database that associates each one of said plurality of multi-mode mobile stations with a particular one of said plurality of conference bridges; and a call control system communicatively coupled to said database and to said plurality of conference bridges, wherein said call control system selectively routes calls to and from said multi-mode mobile stations through their associated conference bridges.

19. The system of claim 18, wherein said plurality of conference bridges is provided by at least one media server.

20. The system of claim 19, wherein said at least one media server is communicatively coupled to said first wireless network via a packet-switched network and is communicatively coupled to said second wireless network via said packet-switched network, a media gateway, and a circuit-switched network.

* * * * *